Jan. 9, 1945.  R. BRUCE  2,366,998
ACCOUNTING AND STATISTICAL SYSTEM
Filed April 7, 1943  6 Sheets-Sheet 1

INVENTOR
Robert Bruce
BY Claude E. Rose
ATTORNEY

Jan. 9, 1945.  R. BRUCE  2,366,998
ACCOUNTING AND STATISTICAL SYSTEM
Filed April 7, 1943  6 Sheets-Sheet 2

INVENTOR
*Robert Bruce*
BY
ATTORNEY

Jan. 9, 1945.   R. BRUCE   2,366,998
ACCOUNTING AND STATISTICAL SYSTEM
Filed April 7, 1943   6 Sheets-Sheet 3

Fig. 6

INVENTOR
Robert Bruce
BY
ATTORNEY

Jan. 9, 1945. R. BRUCE 2,366,998
ACCOUNTING AND STATISTICAL SYSTEM
Filed April 7, 1943 6 Sheets-Sheet 4
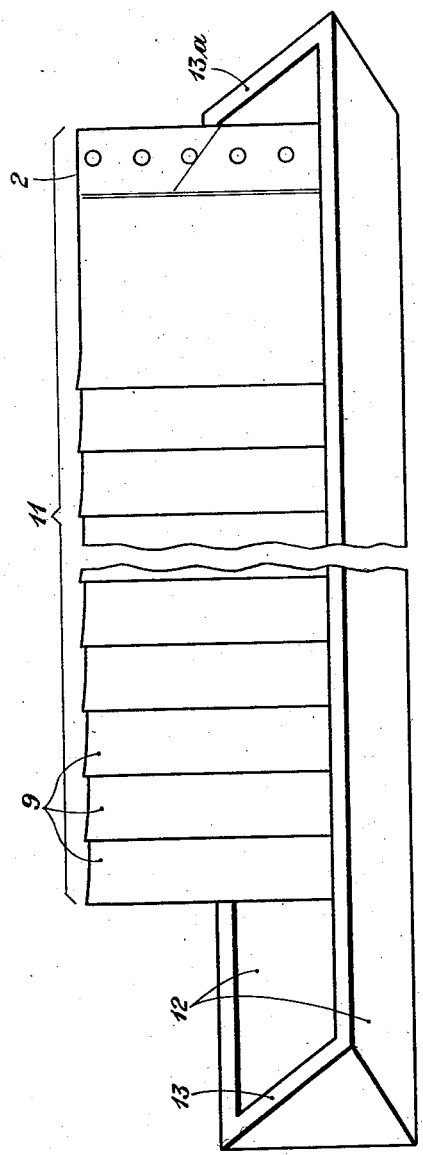
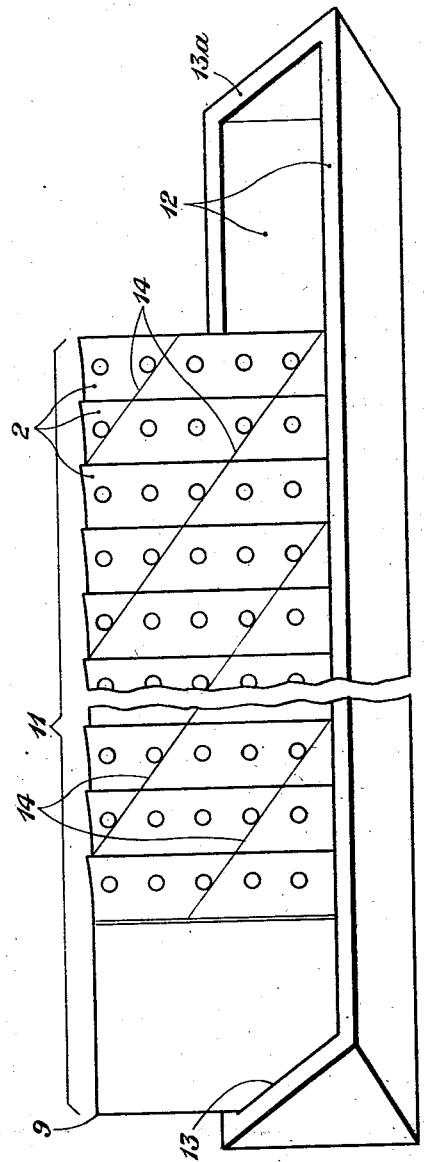
INVENTOR
*Robert Bruce*
BY
ATTORNEY Jan. 9, 1945.  R. BRUCE  2,366,998
ACCOUNTING AND STATISTICAL SYSTEM
Filed April 7, 1943  6 Sheets-Sheet 5

INVENTOR
Robert Bruce
BY Claude leRose
ATTORNEY

Patented Jan. 9, 1945

2,366,998

UNITED STATES PATENT OFFICE 2,366,998

ACCOUNTING AND STATISTICAL SYSTEM

Robert Bruce, Dunellen, N. J., assignor to American Telephone and Telegraph Company, a corporation of New York Application April 7, 1943, Serial No. 482,134

10 Claims. (Cl. 283—66)

This invention relates to a system for recording and summarizing accounting, statistical, or other similar data. In the usual types of manual recording and summarizing systems, difficulty is experienced in quickly locating or finding the desired classification when a posting is to be made. Such systems require the leafing of many accounts other than the one required, with consequent loss of time.

Considerable development work has been done on systems variously known as summary strip, summary board, peg board, peg rod, clip strip or shingle strip method, whereby the original records from which postings are to be made carry preprinted classifications, and are overlapped, or "shingled," by mounting on a row of pins, pegs, or clips, so that amounts recorded opposite like classifications appear in the same line or column, with only the desired amounts exposed to view for accumulation. This makes it possible to summarize the figures by classifications without posting, thereby avoiding the usual difficulty of locating or finding the desired classification. These systems are limited in usefulness to situations where the number of classifications is relatively small and sufficiently constant to permit the classification designations to be preprinted on the original forms.

Considerable development work has also been done on various visible index systems whereby the ultimate records to which postings are made are overlapped, or "shingled," so that only the edge of each document, which shows the classification, is exposed to view. Notwithstanding the use of quite elaborate devices to obtain the overlapping arrangement, comparatively few classifications are exposed to view at any one time, necessitating the supplementary use of guide tabs, tray index labels, or similar indexing media to assist the user to find the desired classification.

One of the objects of this invention, therefore, is to reduce the locating or finding time in a posting operation by making a relatively larger number of classifications visible at one time on a series of documents than is practicable under either of the aforementioned systems. Although designed primarily for application to the ultimate records to which postings are made in a recording or summarizing operation, the invention may also be used on reference records, visible indexes, or other applications where it is desired to bring a great many classification designations into view at one time.

Another object is to make it possible to write data readily on the desired document, after it is located, without disturbing the arrangement of the series of documents.

Another object is to provide considerable space on each document so that many entries may be written thereon over a period of time without affecting the visibility of the classification designation.

Another object is to provide a ready means of removing the documents after the final entries have been made, to permit arranging or sorting them into other sequences to facilitate subsequent statistical or accounting operations.

Another object is to provide a quick and economical means of arranging the same, or other documents, for receiving a new set of entries or postings in a subsequent period.

Further objects will appear from the following detailed description taken in connection with the accompanying drawings, in which:

Fig. 6 is a completely assembled panel comprising many "rows" of assembled forms, with one form exposed on which a supplementary coupon has been attached.

Fig. 7 is a holder containing one "row" of forms with coupons exposed.

Fig. 8 is the same holder containing the same "row" of forms shifted to the left so as to expose the stubs.

The application of this invention and the manner in which the system accomplishes its objects will appear in the course of the following detailed description:

In the specification and claims, the term "form" is used in its broadest sense, so as to include sheets, loose leaves, cards or other elements used in the keeping of accounting or statistical records, reference indices, and the like.

In the specification and claims the terms "coupon" and "stub" refer to specific areas of the form, regardless of whether such areas are delineated by rulings, perforations, or other means, or not at all. The distinction between "coupon" and "stub" will appear from the detailed description.

In general, the means by which the desired objects are accomplished is a form so designed that a number of such forms can be assembled on a peg board, peg rod, or similar device, so as to overlap in two dimensions, both laterally and vertically, instead of in only one dimension as is done in the well-known systems variously known as summary strip, summary board, ped board, etc. Referring to the accompanying drawings, and more particularly to Figs. 1 and 2, the essential features of the form are a series of identical coupons 1, attached to a successive series of stubs 2.

Figures 1, 2, 3:
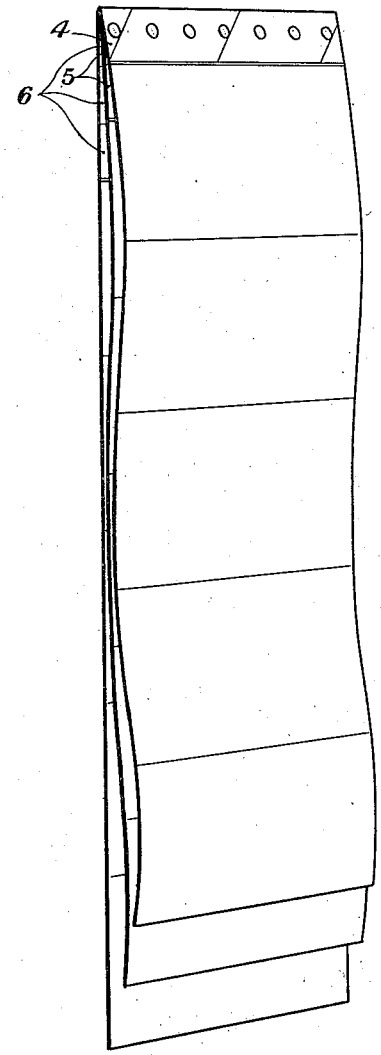
Figure 1 is the basic form with supporting stubs and record coupons arranged in vertical sequence.
Fig. 2 is the basic form with stubs and coupons arranged in horizontal sequence.
Fig. 3 is a perspective view of a "set" of assembled forms with varying number of stubs on the consecutive forms.

The parts may be arranged with stubs at top, bottom, left or right; but the most practical arrangements are those with stubs at top, Fig. 1, or at left, Fig. 2. For sake of illustration, further description will refer to the arrangement with stubs at top, Fig. 1, but it should be understood to apply in like manner to the other three possible arrangements. The number, shape and size of the coupons, the number, shape and size of the stubs, and the degree of overlap in any direction may vary, depending upon the requirements of a particular application. For sake of illustration and description, the form may be assumed to comprise five coupons each 5" x 3" in size, and three stubs each 5" x 1" in size, although other specifications will accomplish the desired results.

Figure 5:
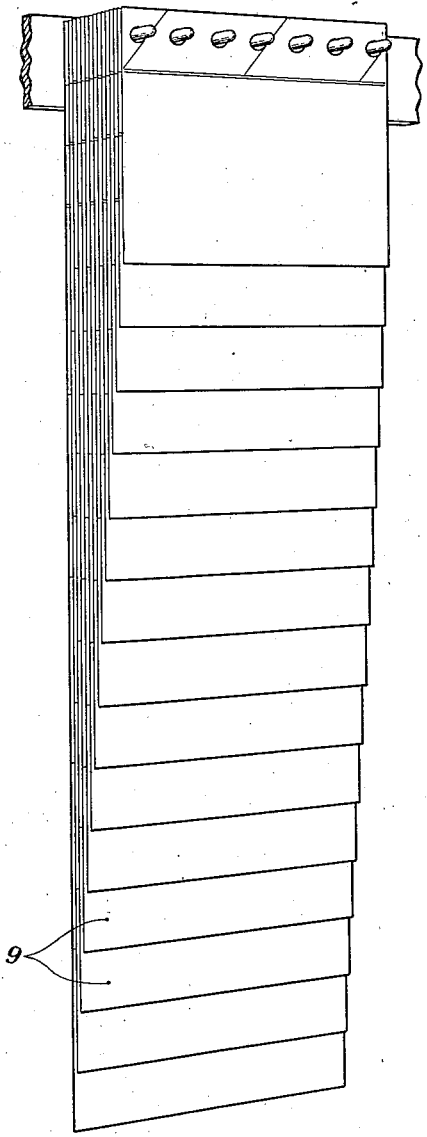
Fig. 5 is a perspective view of a completely assembled "row" of forms with full ranges in the number of forms and the number of coupons comprising each form.

Each of the stubs 2 contains a number of equally spaced holes 3 arranged in a row parallel to its outer edge in such a manner as to fit over the pegs, or posts of the familiar type of peg board, peg rod, visible binder, or similar device, as shown in Figs. 5 and 6; or they may contain suitable markings to aid in aligning them on pins or in clips on the familiar types of pin boards or clip boards.

Figure 4:
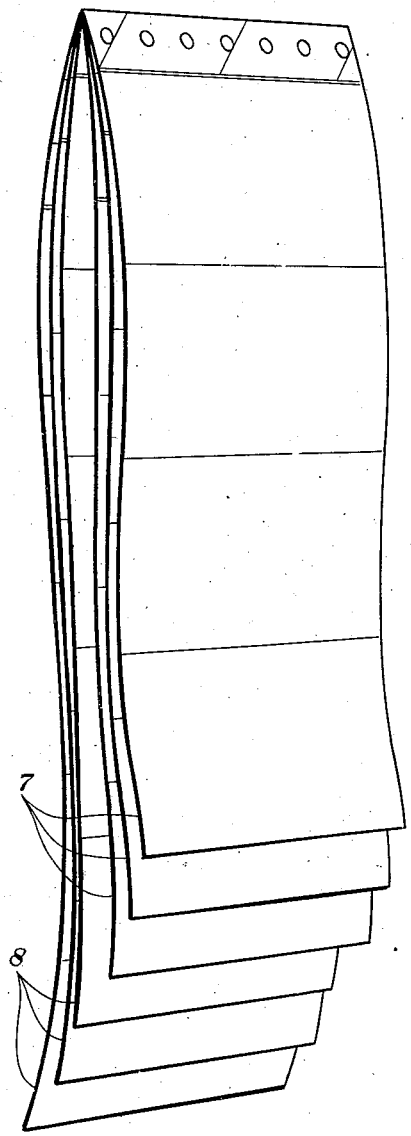
Fig. 4 is a perspective view of a further assembly of forms with variations in both the number of stubs and the number of coupons.

By grouping several forms having successive stubs trimmed off, an arrangement of forms, hereinafter designated as a "set," may be assembled on the pegs or posts in an overlapping or shingled manner to expose only the extreme edges of the end coupons on the underlying forms, as in Fig. 3. In the "set" illustrated, the top form has had two stubs removed, leaving only one stub 4; the next underlying form has had one stub removed, leaving two stubs 5; and the final underlying form has all three stubs 6 left intact. In this set, all coupons remain intact.

Where all stubs on the original form taken in combination have the same overall dimensions as one of the coupons, 5" by 3" in the particular form used for illustration, the last coupon may be removed on each form in a second "set," such as was just described, and these may be mounted above the first "set" which has all coupons intact, resulting in an arrangement with all forms in both "sets" overlapping or shingled to expose only the lower edge of the last coupon on each form, as in Fig. 4. In the particular arrangement used for illustration, the top "set" 7 of three forms has had one coupon removed with four coupons remaining, and the underlying "set" 8 of three forms has all five coupons still intact.

Thus by continuing to reduce progressively the number of stubs on each form of a "set," and by continuing to reduce progressively the number of coupons on the forms of each successive "set," it is possible to build up an arrangement of forms as shown in Fig. 5, hereinafter designated as a "row," containing a considerable number of forms having only the extreme edges 9 exposed. The amount of exposure depends, of course, upon the dimensions of the stub and the coupon, and can be varied to suit the needs of any particular application. In the particular arrangement used for illustration, a complete "row," Fig. 5, would contain five "sets" of three forms each, or a total of fifteen forms, each form having its extreme edge 9 exposed to the extent of one inch, all encompassed in a total length of eighteen inches. Although the illustration for this embodiment indicates that all stubs on the original form taken in combination have the same overall dimensions as one of the coupons, this is not a necessary condition for all possible embodiments and the claims are not to be understood to be limited by these circumstances.

Many such "rows" can be assembled on a peg board, peg rod, visible binder, or similar well-known device, as in Fig. 6, each row overlapping the preceding one so that only the corners 10 of the underlying forms are exposed. The amount of exposure along this dimension depends, of course, upon the spacing between the pegs or posts on which the forms are mounted, and can be varied to suit the needs of any particular use. In the particular arrangement used for illustration, Fig. 6, if the pegs are spaced one inch apart, twenty rows can be mounted in a space of twenty-four inches; thus in an area measuring only eighteen inches by twenty-four inches, as many as three hundred forms can be mounted, each having a corner exposed to the extent of one inch square. This exposed corner area 10 is useful for recording the classification designation assigned to the particular form as indicated in Fig. 6. The classifications are preferably assigned in some logical sequence such as numerical, alphabetical, geographical, etc.

In an application such as the posting of amounts to various accounting or statistical classifications, the body of each coupon 1, Figs. 1 and 2, may be ruled with lines and columns for receiving the entries. In its most efficient arrangement for this purpose, the form has the stubs located at the top, and the rows of forms are mounted with the lower left corners exposed as in Fig. 6, if the user is right-handed, or with the lower right corner exposed if he is left-handed; although the claims should not be understood to be limited to these circumstances. The user of the invention locates the desired classification, inserts the forefinger of one hand under the overhanging forms at that point, turns those forms back only sufficiently to expose the end coupon of the desired form, makes the entry in the body of that coupon with the other hand, and then lets the overhanging forms drop back into place. The slight curl at the exposed corners, which may eventually result from repetition of the operation, is advantageous in that it facilitates the insertion of the forefinger under the overhanging forms. Excessive curl is eventually checked as will be described hereinafter.

When all entries have been completed, each "row" of forms is removed in turn from the pegs and treated as follows, with reference to Figs. 7 and 8. A row of forms 11 is placed on its side in the angle between two planes 12 of some suitable holder, Fig. 7, which is then tilted and joggled so that the shorter forms on top are caused to slide by gravitation toward the opposite end of the longer forms beneath. The forms come to rest, Fig. 8, by gravitational pull against a suitable stop 13 placed within the angle of the side planes 12 of the holder, the formerly exposed edges 9 in exact alignment one above the other, with the stubs 2 exposed in an overlapping manner. Holders for the purpose of aligning forms, as just described, are well known and therefore are not included in the claims for this invention.

Figure 9:
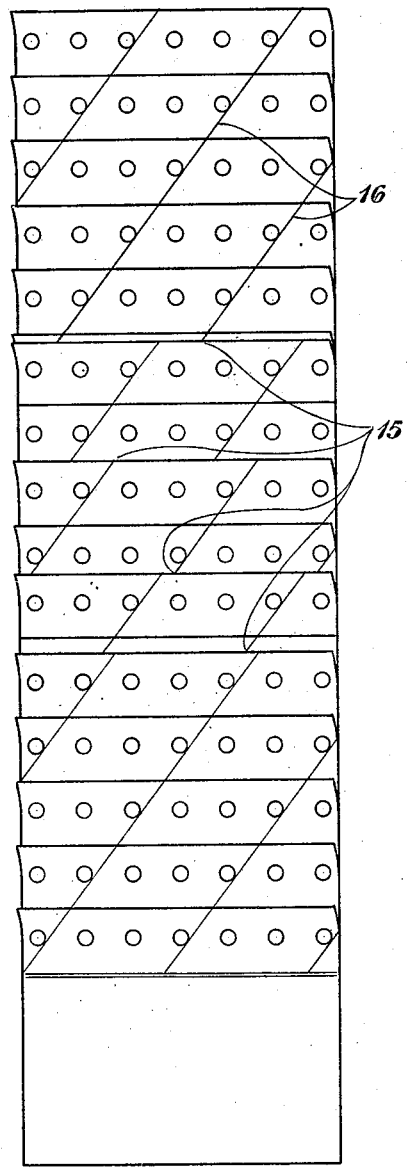
Fig. 9 is a "row" of forms with stubs exposed and two forms out of alignment as indicated by a diagonal pattern.
Figure 10:
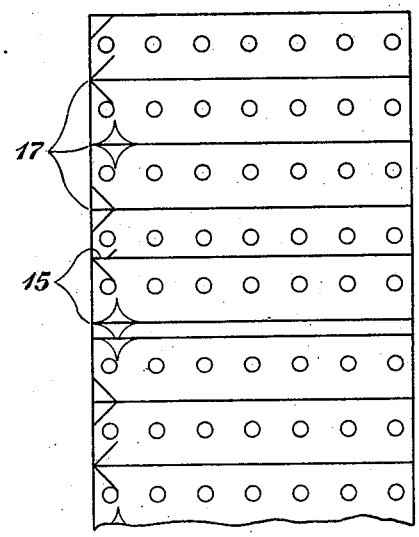
Fig. 10 is a "row" of forms with stubs exposed and one form out of alignment as indicated by a pattern of diverse marginal symbols.
Figure 11:
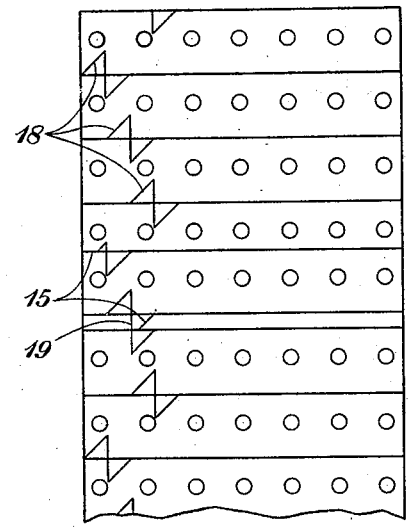
Fig. 11 is a "row" of forms with stubs exposed and one form out of alignment as indicated by a pattern of identical symbols in staggered positions.

In the operation just described, all of the forms may not slide freely, so that one or more of the formerly exposed edges 9 may not be brought into exact alignment one above the other. As an aid to detecting this condition, the stubs of the forms have printed upon them symmetrical geometrical designs arranged in such a manner that when the stubs are properly exposed, the geometrical pattern 14 is continuous throughout the length of the "row" of forms, Fig. 8, but when a form is not in proper position, the continuity of the geometrical pattern is broken at the location 15, Figs. 9, 10 and 11, of the misplaced form. There are endless geometrical patterns which will produce this desired effect. One such pattern is composed of diagonal lines 16, crossing the entire stub, as in Fig. 9; another is composed of various symbols 17, placed along the edge of the form at the junctions between successive stubs, Fig. 10; still another is a series of identical symbols 18, also placed at the junctions between successive stubs but at varying distances from the edge, Fig. 11. A preferable geometrical arrangement is one in which (a) the pattern has continuity from one stub to the next, which continuity will be destroyed if a form is slightly misplaced; (b) each of the several stubs on the form has a marking which differs from the others either in position 16, Fig. 9, or 18, Fig. 11, or in design 17, Fig. 10, so that if a form should chance to be sufficiently out of alignment for its end stub to lie directly over the stub of a form beneath it, the continuity of pattern will nevertheless be broken by the variation in design or position; (c) the pattern contains elements which are far removed from a perpendicular position with respect to the line forming the juncture of adjacent stubs on a form, inasmuch as perpendicular elements 19, Fig. 11, do not serve to indicate a misplaced form.

When proper alignment has been achieved as described in the two preceding paragraphs, the end coupons of the row of forms can all be cut off at one stroke by means of a photographer's cutting board, a guillotine or bookbinder's knife, or other well-known appropriate means. These coupons are then ready to be sorted, filed, or otherwise manipulated like any other unit media used for accounting, statistical, or other recording, summarizing, or indexing purposes. It will be seen that proper alignment of the forms by the means described is essential to prevent coupons from being cut in the wrong place and damaged in this operation.

Figure 12:
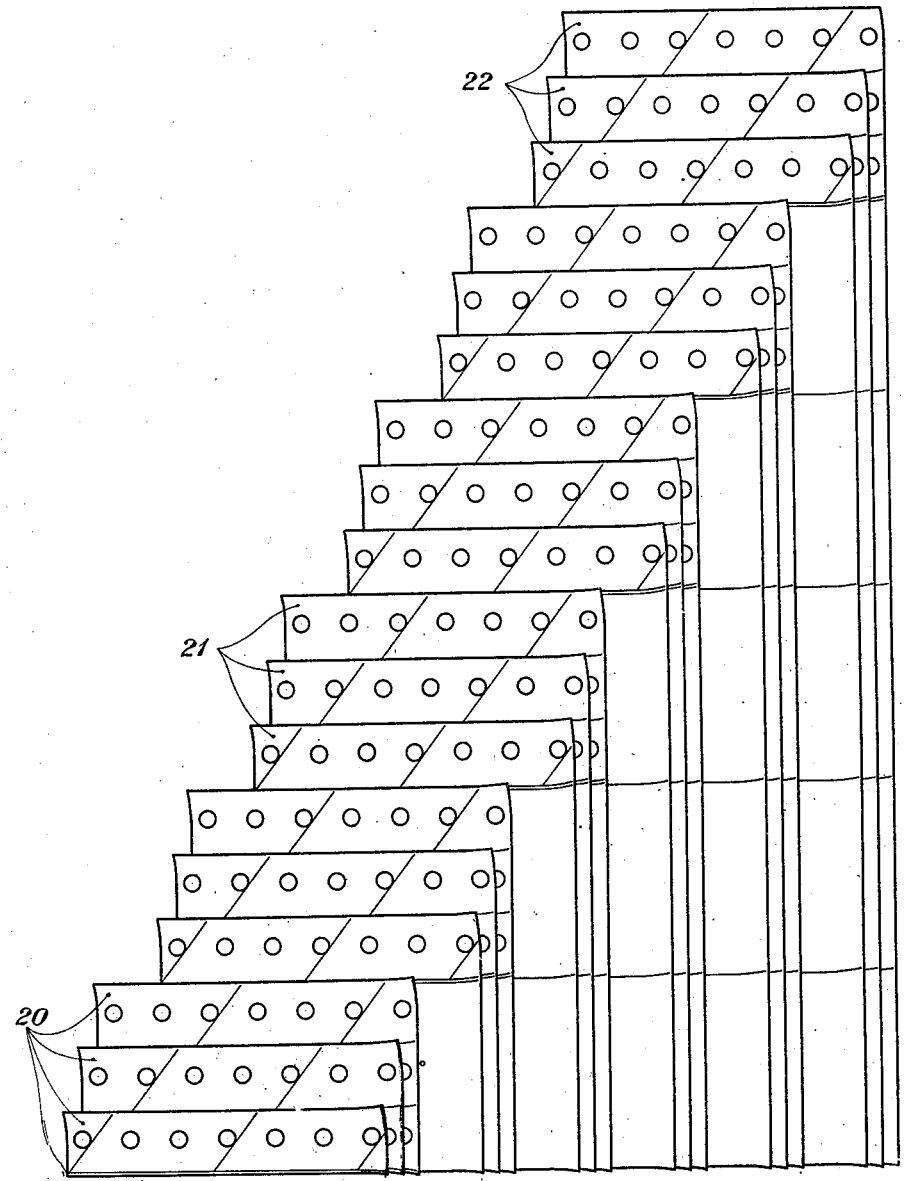
Fig. 12 is a "row" of forms after end coupons have been detached and replacement forms added. The forms are progressively offset to the left in order to show the composition of each of the underlying forms.

Referring to Fig. 12, the row of forms remaining after the end coupons are detached will be composed of a "set" of stubs 20 with no coupons attached and several "sets" of stubs 21, which still have varying numbers of stubs still attached. By throwing away the "set" or stubs 20 with no coupons attached, and by assembling the remaining "sets" of forms 21, with only one new "set" of forms 22, which has all coupons intact, a completely reconstructed "row" of unused forms will be produced. In this connection, the economy of having a number of coupons on each sheet will be apparent. The exposed edges of the end coupons of this reconstructed "row" of forms will all be freshly cut, so curl from previous use will be materially reduced. Referring again to Fig. 8, this reconstructed "row" of forms 11 is placed on its side in the angle between the two planes 12 of the holder previously described, which is then tilted and joggled so that the shorter forms on top slide toward the opposite end of the longer forms beneath. The forms come to rest, Fig. 7, by gravitational pull against a suitable stop 13a, placed within the angle of the side planes 12 of the holder, the formerly exposed stubs 2, in exact alignment one above the other with the edge 9 of the end coupon on each form exposed in an overlapping manner.

The "row" of forms is now ready to be mounted on the pegs or posts of the peg board, peg rod, binder, or similar well-known device, as in Fig. 6, for a repetition of the cycle.

It is not necessary to print an assortment of forms having various quantities of stubs and coupons. Only the basic form need be printed and stocked, with the maximum required number of stubs and coupons. Stubs 2 may be trimmed from forms as required to form "sets," and coupons 1 may be trimmed from forms or "sets" of forms as required to build up original "rows" or to complete the reconstruction of used ones.

The blank coupons thus trimmed off need not be wasted. They may be stapled, pinned, pasted, or otherwise attached to any end coupon 23, Fig. 6, which may be filled up before all postings are completed, thereby providing additional space without disturbing the arrangement.

While this invention has been disclosed in certain specific arrangements which are deemed desirable, it will be obvious that the general principles herein set forth may be embodied in many other organizations, widely different from those illustrated, without departing from the spirit of the invention as defined in the appended claims.

What is claimed is:

1. In a recording system, a row of forms consisting of a plurality of sets of forms superposed on each other, each set including a plurality of forms, each form of each set having at least one appropriately designated coupon area on which data may be inscribed and a plurality of appropriately designated stub areas by which the form may be suspended, the number of coupon areas being the same for each form in a set, the stub areas of each form in a set being so related in number and size to the dimensions of the end coupon area of the form, that, by removing different numbers of stub areas from the several forms of the set and arranging the forms with their outermost remaining stub areas in alignment, each set of forms may be suspended by the aligned stub areas with portions of the end coupon areas of the underlying forms exposed along their outer edges in stepped or shingled position with respect to each other, each set of forms of a row having a different number of coupon areas from the other sets in the row, so that when the suspended sets are superposed upon each other with all of their outermost stub areas in alignment all of the end coupon areas of the forms constituting the entire row will be in stepped or shingled position with respect to each other.

2. In a recording system, a row of forms consisting of a plurality of sets of forms superposed on each other, each set including a plurality of forms, each form of each set having at least one appropriately designated coupon area on which data may be inscribed and a plurality of appropriately designated stub areas by which the form may be suspended, the number of coupon areas being the same for each form in a set, the stub areas of each form in a set being arranged in successive order with respect to each other and the adjacent coupon area, and said stub areas having such dimensions that the overall span of the succession of stub areas will not be greater than that of the attached coupon area, so that by removing different numbers of stub areas from the several forms of each set and arranging the forms with their outermost remaining stub areas in alignment, the set of forms may be suspended by the aligned stub areas with portions of the end coupon areas of the underlying forms exposed along their outer edges in stepped or shingled position with respect to each other, and each set of forms of a row having a different number of coupon areas from the other sets in the row, so that when the suspended sets are superposed upon each other with all of their outermost stub areas in alignment all of the end coupon areas of the forms constituting the entire row will be in stepped or shingled position with respect to each other.

3. In a recording system, a row of forms consisting of a plurality of sets of forms superposed on each other, each set including a plurality of forms, each form of each set having at least one appropriately designated coupon area on which data may be inscribed and a plurality of appropriately designated stub areas by which the form may be suspended, the number of coupon areas being the same for each form in a set, the stub areas of each form in a set being arranged in successive order with respect to each other and the adjacent coupon area, and said stub areas having such dimensions that the overall span of the succession of stub areas will not be greater than that of the attached coupon area, at least one stub area of each form of each set having a row of holes spaced and positioned similarly to the holes of stub areas of the other forms of the set to enable the forms to be suspended on a row of suspension elements, so that by removing different numbers of stub areas from the several forms of each set and arranging the forms of the set with the holes in their outermost remaining stub areas in alignment, the set of forms may be suspended by the aligned stub areas with portions of the end coupon areas of the underlying forms exposed along their outer edges in stepped or shingled position with respect to each other, and each set of forms of a row having a different number of coupon areas from the other sets in the row, so that when the suspended sets are superposed upon each other with all of their outermost stub areas in alignment all of the end coupon areas of the forms constituting the entire row will be in stepped or shingled position with respect to each other.

4. In a recording system, a number of sets of forms each including a plurality of forms, said sets being transversely displaced with respect to each other, each form of each set having at least one appropriately designated coupon area upon which data may be inscribed and a plurality of appropriately designated stub areas by which the form may be suspended, the stub areas of each form of each set being so related in number and size to the dimensions of the end coupon area of the form, that, by removing different numbers of stub areas from the several forms of each set and arranging the forms of the set with their outermost remaining stub areas in alignment, each set of forms may be suspended by the aligned stub areas with portions of the end coupon areas of the underlying forms exposed along their outer edges in stepped or shingled position with respect to each other in a longitudinal direction, and the suspension stub areas of the different sets of forms partially overlying each other in such manner that the forms of the different sets will overlap each other in a transverse direction.

5. In a recording system, a number of sets of forms each including a plurality of forms, said sets being transversely displaced with respect to each other, each form of each set having at least one appropriately designated coupon area upon which data may be inscribed and a plurality of appropriately designated stub areas by which the form may be suspended, the stub areas of each form of each set being arranged in successive order with respect to each other and the adjacent coupon area, and said stub areas having such dimensions that the overall span of the succession of stubs will not be greater than that of an attached coupon area, so that by removing different numbers of stub areas from the several forms of each set and arranging the forms of the set with their outermost remaining stub areas in alignment, each set of forms may be suspended by the aligned stub areas with portions of the end coupon areas of the underlying forms exposed along their outer edges in stepped or shingled position with respect to each other in a longitudinal direction, and the suspension stub areas of the different sets of forms partially overlying each other in such manner that the forms of the different sets will overlap each other in a transverse direction.

6. In a recording system, a number of sets of forms each including a plurality of forms, said sets being transversely displaced with respect to each other, each form of each set having at least one appropriately designated coupon area upon which data may be inscribed and a plurality of appropriately designated stub areas by which the form may be suspended, the stub areas of each form of each set being arranged in successive order with respect to each other and the adjacent coupon area, and said stubs having such dimensions that the overall span of the succession of stub areas will not be greater than that of an attached coupon area, at least one stub area of each form of each set having a row of holes spaced and positioned similarly to holes of the stub areas of the other forms of the set to enable the forms to be suspended on a row of suspension elements, so that by removing different numbers of stub areas from the several forms of each set and arranging the forms of the set with their outermost remaining stub areas in alignment, each set of forms may be suspended by the aligned stub areas with portions of the end coupon areas of the underlying forms exposed along their outer edges in stepped or shingled position with respect to each other in a longitudinal direction, and the suspension stub areas of the different sets of forms partially overlying each other in such manner that the forms of the different sets will overlap each other in a transverse direction.

7. In a recording system, a number of rows of forms, each row consisting of a plurality of sets of forms superposed on each other, each set including a plurality of forms, each form of each set having at least one appropriately designated coupon area on which data may be inscribed and a plurality of appropriately designated stub areas by which the form may be suspended, the number of coupon areas being the same for each form in a set, the stub areas of each form in a set being so related in number and size to the dimensions of the end coupon area of the form, that, by removing different numbers of stub areas from the several forms of each set and arranging the forms with their outermost remaining stub areas in alignment, each set of forms may be suspended by the aligned stub areas with portions of the end coupon areas of the underlying forms exposed along their outer edges in stepped or shingled position with respect to each other, each set of forms of a row having a different number of coupon areas from the other sets in the row, so that when the suspended sets are superposed upon each other with all of their outermost stub areas in alignment all of the end coupon areas of the forms constituting the entire row will be in stepped or shingled position with respect to each other in a longitudinal direction, and the suspension stub areas of the different rows of forms partially overlying each other in such manner that the several rows of forms will overlap each other in a transverse direction.

8. In a recording system, a number of rows of forms, each row consisting of a plurality of sets of forms superposed on each other, each set including a plurality of forms, each form of each set having at least one appropriately designated coupon area on which data may be inscribed and a plurality of appropriately designated stub areas by which the form may be suspended, the number of coupon areas being the same for each form in a set, the stub areas of each form in a set being arranged in successive order with respect to each other and the adjacent coupon area, and said stub areas having such dimensions that the overall span of the succession of stub areas will not be greater than that of an attached coupon area, so that by removing different numbers of stub areas from the several forms of each set and arranging the forms with their outermost remaining stub areas in alignment, each set of forms may be suspended by the aligned stub areas with portions of the end coupon areas of the underlying forms exposed along their outer edges in stepped or shingled position with respect to each other, each set of forms of a row having a different number of coupons areas from the other sets in the row, so that when the suspended sets are superposed upon each other with all of their outermost stub areas in alignment all of the end coupon areas of the forms constituting the entire row will be in stepped or shingled position with respect to each other in a longitudinal direction, and the suspension stub areas of the different rows of forms partially overlying each other in such manner that the several rows of forms will overlap each other in a transverse direction.

9. In a recording system, a number of rows of forms, each row consisting of a plurality of sets of forms superposed on each other, each set including a plurality of forms, each form of each set having at least one appropriately designated coupon area on which data may be inscribed and a plurality of appropriately designated stub areas by which the form may be suspended, the number of coupon areas being the same for each form in a set, the stub areas of each form in a set being arranged in successive order with respect to each other and the adjacent coupon area, and said stub areas having such dimensions that the overall span of the succession of stub areas will not be greater than that of the attached coupon area, at least one stub area of each form of each set having a row of holes spaced and positioned similarly to the holes of stub areas of the other forms of the set to enable the forms to be suspended on a row of suspension elements, so that by removing different numbers of stub areas from the several forms of each set and arranging the forms with their outermost remaining stub areas in alignment, each set of forms may be suspended by the aligned stub areas with portions of the end coupon areas of the underlying forms exposed along their outer edges in stepped or shingled position with respect to each other, each set of forms of a row having a different number of coupon areas from the other sets in the row, so that when the suspended sets are superposed upon each other with all of their outermost stub areas in alignment all of the end coupon areas of the forms constituting the entire row will be in stepped or shingled position with respect to each other in a longitudinal direction, and the suspension stub areas of the different rows of forms partially overlying each other in such manner that the several rows of forms will overlap each other in a transverse direction.

10. In a recording system, a row of forms consisting of a plurality of sets of forms superposed on each other, each set including a plurality of forms, each form of each set having at least one appropriately designated coupon area on which data may be inscribed and a plurality of appropriately designated stub areas by which the form may be suspended, the number of coupon areas being the same for each form in a set, the stub areas of each form in a set being arranged in successive order with respect to each other and the adjacent coupon area, and said stub areas having such dimensions that the overall span of the succession of stub areas will not be greater than that of the attached coupon area, so that by removing different numbers of stub areas from the several forms of each set and arranging the forms with their outermost remaining stub areas in alignment, the set of forms may be suspended by the aligned stub areas with portions of the end coupon areas of the underlying forms exposed along their outer edges in stepped or shingled position with respect to each other, each set of forms of a row having a different number of coupon areas from the other sets in the row, so that when the suspended sets are superposed upon each other with all of their outermost stub areas in alignment all of the end coupon areas of the forms constituting the entire row will be in stepped or shingled position with respect to each other, and a marking upon the face of each stub area, the markings upon consecutive stub areas differing from each other in pattern in such manner that when the forms of a row are shifted in relative position so as to bring all of their end coupon areas into alignment, the outermost stub areas of the forms will appear in echelon formation with the markings on the stub areas having a uniform pattern from one stub area to another, said marking appearing non-uniform when any set is out of alignment.

ROBERT BRUCE.